(12) United States Patent
Yoon et al.

(10) Patent No.: US 11,848,114 B2
(45) Date of Patent: Dec. 19, 2023

(54) METHOD FOR DISMANTLING NUCLEAR FACILITY UNDERWATER

(71) Applicant: KOREA HYDRO & NUCLEAR POWER CO., LTD., Gyeongju-si (KR)

(72) Inventors: Ju-Young Yoon, Daejeon (KR); Young Hwan Hwang, Daejeon (KR); Mi-Hyun Lee, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 187 days.

(21) Appl. No.: 17/429,031

(22) PCT Filed: Feb. 14, 2020

(86) PCT No.: PCT/KR2020/002135
§ 371 (c)(1),
(2) Date: Aug. 6, 2021

(87) PCT Pub. No.: WO2020/167043
PCT Pub. Date: Aug. 20, 2020

(65) Prior Publication Data
US 2022/0139583 A1    May 5, 2022

(30) Foreign Application Priority Data
Feb. 14, 2019  (KR) .................. 10-2019-0017282

(51) Int. Cl.
*G21D 1/00*       (2006.01)
*G21C 13/024*     (2006.01)
*G21C 19/00*      (2006.01)

(52) U.S. Cl.
CPC ........... *G21D 1/003* (2013.01); *G21C 13/024* (2013.01); *G21C 19/00* (2013.01)

(58) Field of Classification Search
CPC ....... G21D 1/003; G21C 13/024; G21C 19/00
(Continued)

(56) References Cited

U.S. PATENT DOCUMENTS

| 6,625,245 B1* | 9/2003 | Aoki .................. G21D 1/00 376/260 |
| 8,873,696 B2 | 10/2014 | Heim et al. |
| 2021/0210236 A1* | 7/2021 | Hyun .................... G21D 1/003 |

FOREIGN PATENT DOCUMENTS

| JP | 59-087400 | 5/1984 |
| JP | S60-93399 | 5/1985 |

(Continued)

OTHER PUBLICATIONS

Segerud, "Latest Experience from José Cabrera Reactor Vessel Dismantling Project-15214", In WM Symposia, Inc.: Tempe, AZ, USA, 2015 (pp. 1-9). (Year: 2015).*

(Continued)

*Primary Examiner* — Jack W Keith
*Assistant Examiner* — Daniel Wasil
(74) *Attorney, Agent, or Firm* — LEX IP MEISTER, PLLC

(57) ABSTRACT

An underwater decommissioning method of a nuclear facility including a nuclear reactor pressure vessel and bio-protective concrete comprising a cavity in which the nuclear reactor pressure vessel is positioned is disclosed. The method includes: (a) lifting the nuclear reactor pressure vessel above the cavity; (b) forming an insertion part in the bio-protective concrete adjacent to the cavity, filling the insertion part with water, and installing a support part on a bottom surface of the insertion part; (c) inserting the nuclear reactor pressure vessel in the insertion part and mounting a lower portion of the nuclear reactor pressure vessel on the support part; and (d) repeatedly cutting portions of the nuclear reactor pressure vessel mounted on the support part (Continued)

by using a cutting device in an underwater position. The method allows performing cutting operations in the water, and thus, it is possible to prevent radiation exposure due to occurrence of dust.

4 Claims, 9 Drawing Sheets

(58) Field of Classification Search
USPC .......................................................... 376/260
See application file for complete search history.

(56) References Cited

FOREIGN PATENT DOCUMENTS

| | | |
|---|---|---|
| JP | H04158297 | 6/1992 |
| JP | 08-240693 | 9/1996 |
| JP | 4850214 | 1/2012 |
| JP | 6337410 | 6/2018 |
| KR | 10-2014-0048339 | 4/2014 |
| KR | 10-1754538 | 7/2017 |

OTHER PUBLICATIONS

Brusa, "The Decommissioning of the Trino Nuclear Power Plant", Sogin (IT); ND& CU BNFL (GB); BNFL Inc.(US), 2002. (Year: 2002).*

Boing, "Beneficial Re-Use of Decommissioned Former Nuclear Facilities", ANL/TD/CP-93634, Argonne National Lab, Argonne, IL (US), 1997. (Year: 1997).*

EPO, the extended European search report of the corresponding European Patent Application No. 20756590.4.dated Sep. 19, 2022.

* cited by examiner

METHOD FOR DISMANTLING NUCLEAR FACILITY UNDERWATER

TECHNICAL FIELD

The present invention relates to an underwater decommissioning method of a nuclear facility that decommissions a nuclear facility in an underwater environment.

BACKGROUND ART

Generally, among nuclear facilities used for nuclear power generation, a pressurized water reactor type of nuclear power plant includes a nuclear reactor pressure vessel and bio-protective concrete for surrounding the nuclear reactor pressure vessel.

When decommissioning a nuclear facility, it is necessary to separate the nuclear reactor pressure vessel from the bio-protective concrete, and to cut and decommission the nuclear reactor pressure vessel.

However, in the process of cutting and decommissioning the nuclear reactor pressure vessel, there are problems that a worker is exposed to radiation and an environment is polluted due to generation of dust.

DISCLOSURE

Technical Problem

An embodiment of the present invention is to provide an underwater decommissioning method of a nuclear facility that prevents radiation exposure and prevents environmental pollution by dust.

Technical Solution

An embodiment of the present invention provides an underwater decommissioning method of a nuclear facility that includes a nuclear reactor pressure vessel and bio-protective concrete including a cavity in which the nuclear reactor pressure vessel is positioned, including: (a) lifting the nuclear reactor pressure vessel from the bio-protective concrete above the cavity; (b) forming an insertion part in the bio-protective concrete adjacent to the cavity, filling the insertion part with water, and installing a support part on a bottom surface of the insertion part; (c) inserting the nuclear reactor pressure vessel in the insertion part and mounting a lower portion of the nuclear reactor pressure vessel on the support part; and (d) repeatedly cutting portions of the nuclear reactor pressure vessel mounted on the support part by using a cutting device in an underwater position in decommissioning the nuclear facility.

The support part may include a mounting portion corresponding to a lower portion of the nuclear reactor pressure vessel.

The mounting portion may include a curved surface.

The mounting portion may include a plurality of steps.

The support part may be provided with a through hole that penetrates from an outer surface thereof to a position of the mounting portion so that an outer surface of the nuclear reactor pressure vessel mounted on the support part is exposed and through which the cutting device is inserted.

A plurality of the through holes may be radially formed with respect to a center of the mounting portion.

The (d) step may include: (d-1) cutting portions of the nuclear reactor pressure vessel at a position below a water surface of the insertion part in decommissioning the nuclear facility; (d-2) transporting an uncut portion positioned outside the water surface of the nuclear reactor pressure vessel to the inside of the cavity; and (d-3) transporting portions of the nuclear reactor pressure vessel cut in the (d-1) step to a packaging container. The portions of the nuclear reactor pressure vessel may include a first portion that is a lower portion of the nuclear reactor pressure vessel, a second portion that is a central portion thereof, and a third portion that is an upper portion thereof The (d-1) step may include: mounting a lower portion of the first portion of the nuclear reactor pressure vessel on the curved surface of the mounting portion and cutting it; mounting a lower portion of the second portion of the nuclear reactor pressure vessel on the plurality of steps of the mounting portion and cutting it; and mounting a lower portion of the third portion of the nuclear reactor pressure vessel on the plurality of steps of the mounting portion and cutting it.

The nuclear facility may further include a crane positioned above the bio-protective concrete.

The lifting of the nuclear reactor pressure vessel above the cavity may be performed by lifting the nuclear reactor pressure vessel from the bio-protective concrete by using the crane.

Transporting cut portions of the nuclear reactor pressure vessel cut by the cutting device in decommissioning the nuclear facility to a process of cutting according to a packaging standard may be further included.

Advantageous Effects

According to the embodiment of the present invention, it is possible to perform cutting operations in the water in decommissioning the nuclear facility, and thus, in a process of cutting a nuclear reactor pressure vessel in decommissioning the nuclear facility, it is possible to prevent radiation exposure of workers and occurrence of environmental pollution due to occurrence of dust.

MODE FOR INVENTION

Figure 1:
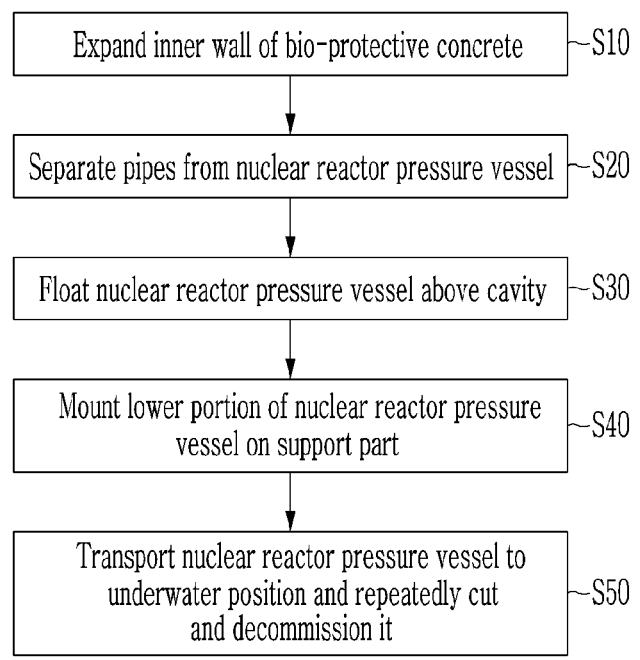
FIG. 1 schematically illustrates a flowchart of an underwater decommissioning method of a nuclear facility according to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Hereinafter, a pressurized water reactor (PWR) type of nuclear power plant will be exemplified as the nuclear facility, and without being limited to this, the nuclear facility may be a boiling water reactor (BWR) type of nuclear power plant.

The pressurized water reactor type of nuclear power plant uses light-water as a coolant and moderator, and uranium 235 is concentrated to about 2% to 4% to be used as nuclear fuel. A pressurized light-water reactor type of nuclear power plant is divided into a facility related to a nuclear reactor system that transmits heat generated by nuclear fission within a reactor to a steam generator for heat exchange; and a facility related to a turbine and generator system that turns a turbine with steam generated from the steam generator, returns it to water through a condenser, and then circulates it back to the steam generator.

Generally, a coolant (light-water), which is a heat transfer medium of a nuclear reactor system, is heated to about 320° C. in a nuclear reactor and pressurized to about 153 atmospheres so that it does not boil. Equipment configuring the system includes a pressurizer that adjusts pressure to maintain a constant enthalpy, and a coolant pump that circulates the coolant between the reactor and the steam generator. A system in which the steam generated from the steam generator rotates the turbine to generate power from a generator connected to a turbine shaft may be the same as that of a general thermal power plant.

Figure 2:
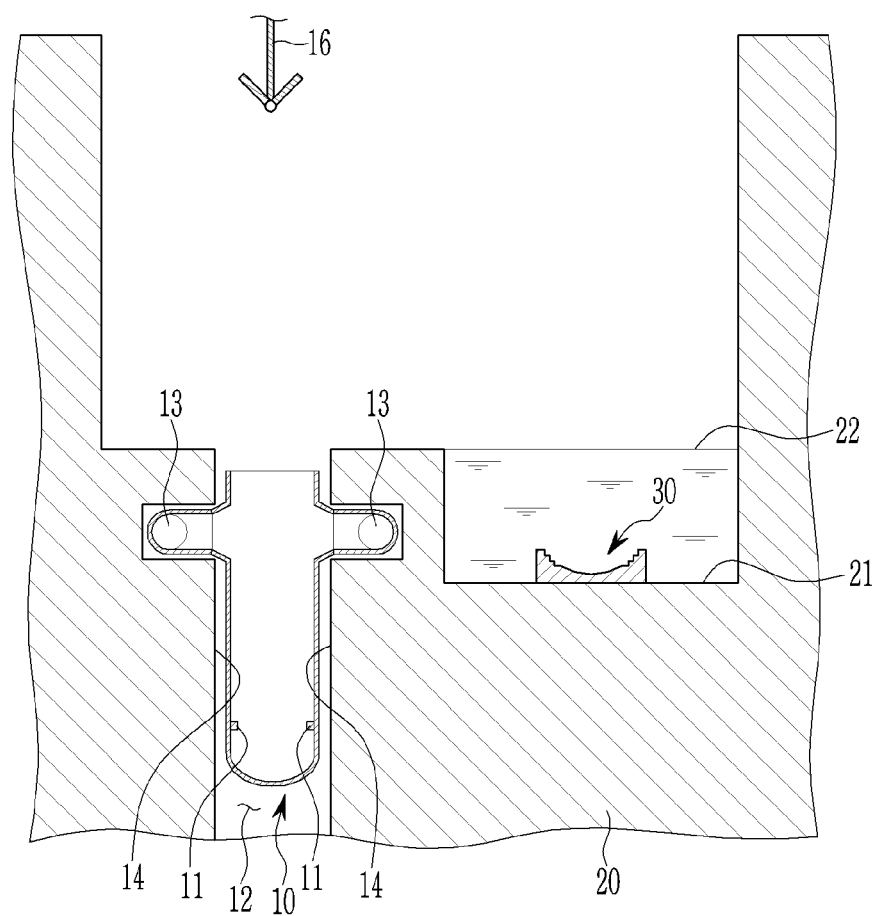
FIG. 2 schematically illustrates a part of a nuclear facility according to an embodiment of the present invention.

FIG. 1 schematically illustrates a flowchart of an underwater decommissioning method of a nuclear facility according to an embodiment of the present invention, and FIG. 2 schematically illustrates a part of a nuclear facility according to an embodiment of the present invention.

As illustrated in FIG. 2, a nuclear facility may include a nuclear reactor pressure vessel 10, a plurality of pipes 13 directly connected to the nuclear reactor pressure vessel 10, bio-protective concrete 20 surrounding the nuclear reactor pressure vessel 10 and the pipes 13 and supporting the nuclear reactor pressure vessel 10, and a crane 16. The nuclear facility may further include various known configurations in addition to the configurations shown in FIG. 2.

The nuclear reactor pressure vessel 10 may be a pressurized water reactor type, but is not limited thereto. For example, the nuclear reactor pressure vessel 10 may be a boiling water reactor type. A protrusion 11 supporting various known types of cores protrudes from an inner wall of the nuclear reactor pressure vessel 10.

The plurality of pipes 13 are connected to various types of known steam generators. Hot water may pass through one of the pipes 13, and cold water may pass through the other pipe thereof, but the present invention is not limited thereto.

The bio-protective concrete 20 may include a cavity 12 in which the nuclear reactor pressure vessel 10 is positioned, and the inner wall 14 forming the cavity 12 and facing the nuclear reactor pressure vessel 10.

On the other hand, in the bio-protective concrete 20, an insertion part 21 may be formed adjacent to the cavity 12.

The insertion part 21 is formed at a position spaced apart from the side surface of the cavity 12 formed in the bio-protective concrete 20, and this position refers to a place where the cutting operations in decommissioning the nuclear facility are performed while the nuclear reactor pressure vessel 10 transported by the crane 16 from the cavity 12 is mounted on the bottom surface of the insertion part 21.

The insertion part 21 is formed in a state of being inserted into the bio-protective concrete 20, and may have a size that is larger than a diameter of the cavity 12.

Since the insertion part 21 is formed in this way, the cutting operations in decommissioning the nuclear facility may be performed under water in a state in which the nuclear reactor pressure vessel 10 transported from the cavity 12 is mounted on the inner bottom surface of the insertion part 21.

This allows the process of cutting the nuclear reactor pressure vessel 10 in decommissioning the nuclear facility to be performed in the water filled in the insertion part 21, thereby preventing environmental pollution caused by radiation exposure of workers and dust generation during the cutting work in decommissioning the nuclear facility. This will be described in detail below.

Meanwhile, the crane 16 may be positioned above the bio-protective concrete 20.

The crane 16 may be a crane 16 used during initial installation of the nuclear facility, but is not limited thereto.

Figure 3:
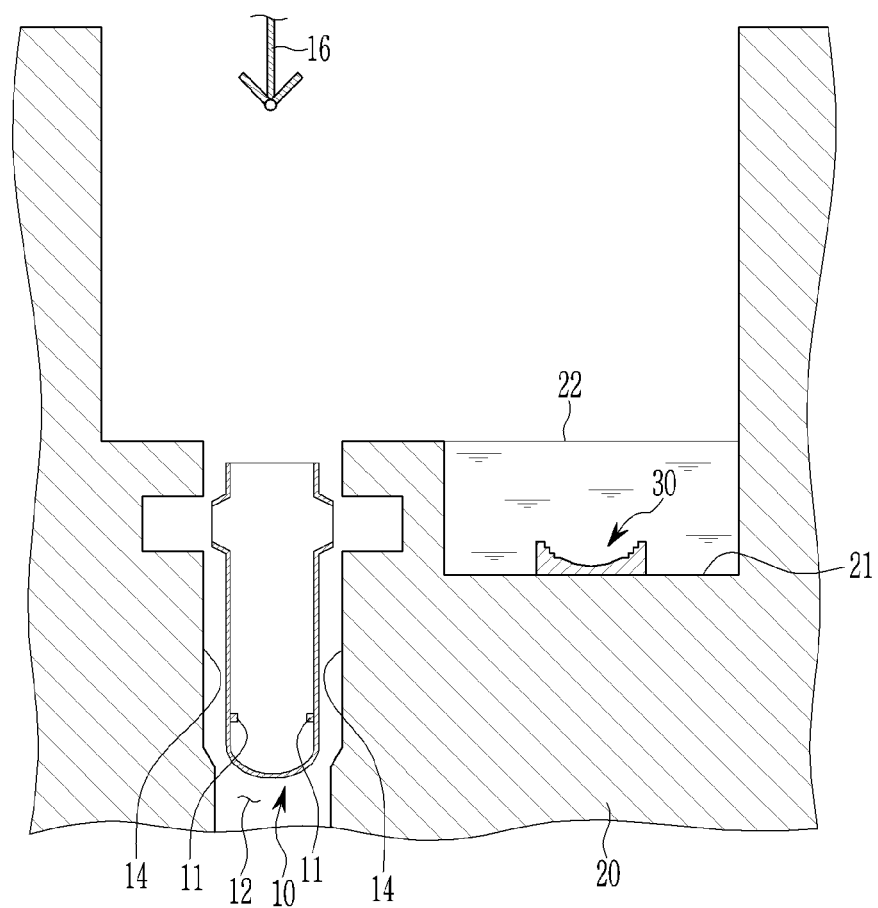
FIG. 3 illustrates a partial view of a state in which an inner wall of bio-protective concrete is expanded and pipes are separated from a nuclear reactor pressure vessel in the nuclear facility illustrated in FIG. 2.

FIG. 3 illustrates a state in which the inner wall of the bio-protective concrete is expanded and the pipes are separated from the nuclear reactor pressure vessel in the nuclear facility shown in FIG. 2.

Referring to FIG. 2 and FIG. 3, the inner wall 14 of the bio-protective concrete 20 forming the cavity 12 may be cut and expanded by using a cutting member such as a wire saw or a circular saw.

In FIG. 3, a part of the inner wall 14 corresponding to the nuclear reactor pressure vessel 10 is expanded, but the present invention is not limited thereto, and a part of the inner wall 14 corresponding to an upper portion of the pipes 13 may be expanded (S10).

In FIG. 3, a part of the inner wall 14 corresponding to the nuclear reactor pressure vessel 10 is expanded, but the present invention is not limited thereto, and a part of the inner wall 14 corresponding to an upper portion of the pipes 13 may be expanded.

Meanwhile, before expanding the inner wall 14 of the bio-protective concrete 20, insulation surrounding the nuclear reactor pressure vessel 10 may be removed.

Next, the pipes 13 are separated from the nuclear reactor pressure vessel 10 (S20).

Specifically, the pipes 13 exposed through the expanded inner wall 14 of the bio-protective concrete 20 are cut in a diameter direction of the pipes 13, and the pipes 13 are separated from the nuclear reactor pressure vessel 10.

The cutting of the pipes 13 may be performed by using a wire saw, but is not limited thereto, and may be performed by using another cutting member such as a circular saw.

Since the pipes 13 are completely exposed through the expanded inner wall 14, the pipes 13 may be easily cut through the expanded inner wall 14 by using a cutting member.

Figure 4:
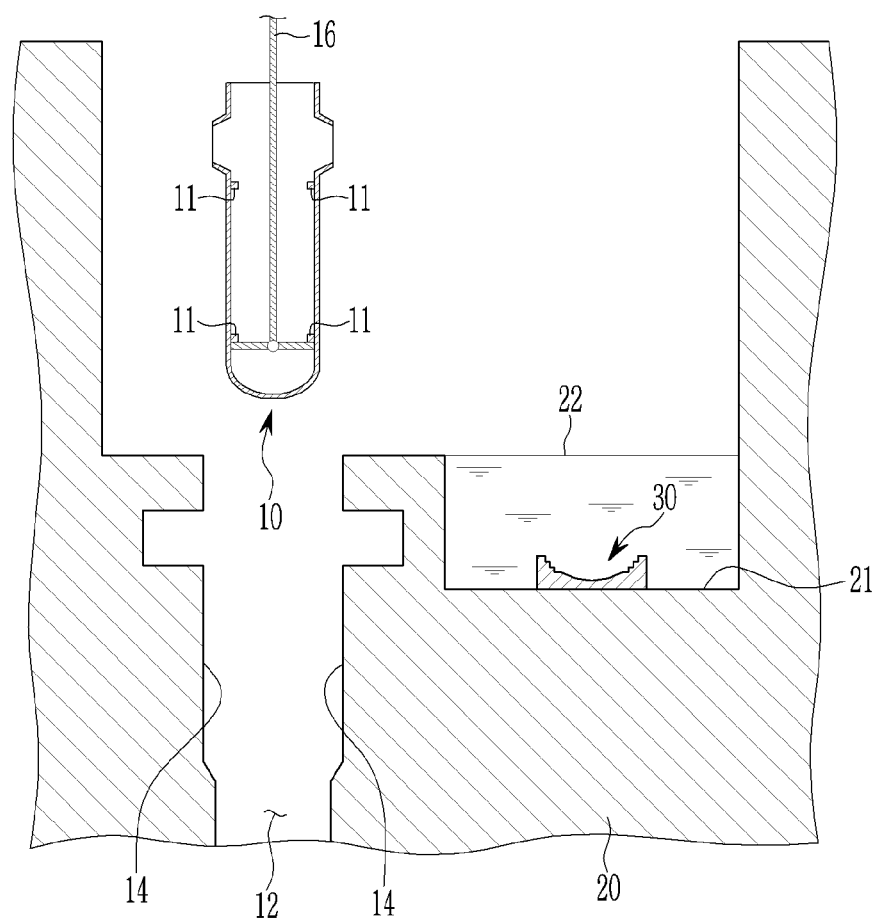
FIG. 4 illustrates a schematic view of a state in which a nuclear reactor pressure vessel is lifted above a cavity in the nuclear facility of FIG. 3.

FIG. 4 illustrates a schematic view of a state in which a nuclear reactor pressure vessel is lifted above a cavity in the nuclear facility of FIG. 3.

Next, referring to FIG. 4, the nuclear reactor pressure vessel 10 is lifted above the cavity 12 (S30).

Specifically, the nuclear reactor pressure vessel 10, whose pipes are cut through the expanded inner wall 14 of the bio-protective concrete 20, is lifted from the bio-protective concrete 20 by using the crane 16 to be lifted above the cavity 12 of the bio-protective concrete 20.

In this case, the crane 16 may support the protrusion 11 protruding on the inner wall of the nuclear reactor pressure vessel 10 to lift the nuclear reactor pressure vessel 10 from the bio-protective concrete 20, but is not limited thereto.

For example, the crane 16 may support an upper part of the nuclear reactor pressure vessel 10 to lift the nuclear reactor pressure vessel 10 from the bio-protective concrete 20.

Since the pipes connected to the nuclear reactor pressure vessel 10 are cut and separated through the expanded inner wall 14, the nuclear reactor pressure vessel 10 may be easily lifted from the bio-protective concrete 20 without interference by the bio-protective concrete 20 and the pipes.

Subsequently, the insertion part is formed adjacent to the cavity 12 and is filled with water 22, and a support part 30 is installed in the insertion part 21.

Here, the support part 30 may have a curved surface 31 and a plurality of steps 33 for supporting the nuclear reactor pressure vessel 10.

That is, in the support part 30, the curved surface 31 supporting a round-shaped portion of the lower portion of the nuclear reactor pressure vessel and the plurality of steps 33 on which the cut portion of the nuclear reactor pressure vessel 10 is mounted may be formed.

Figure 5:
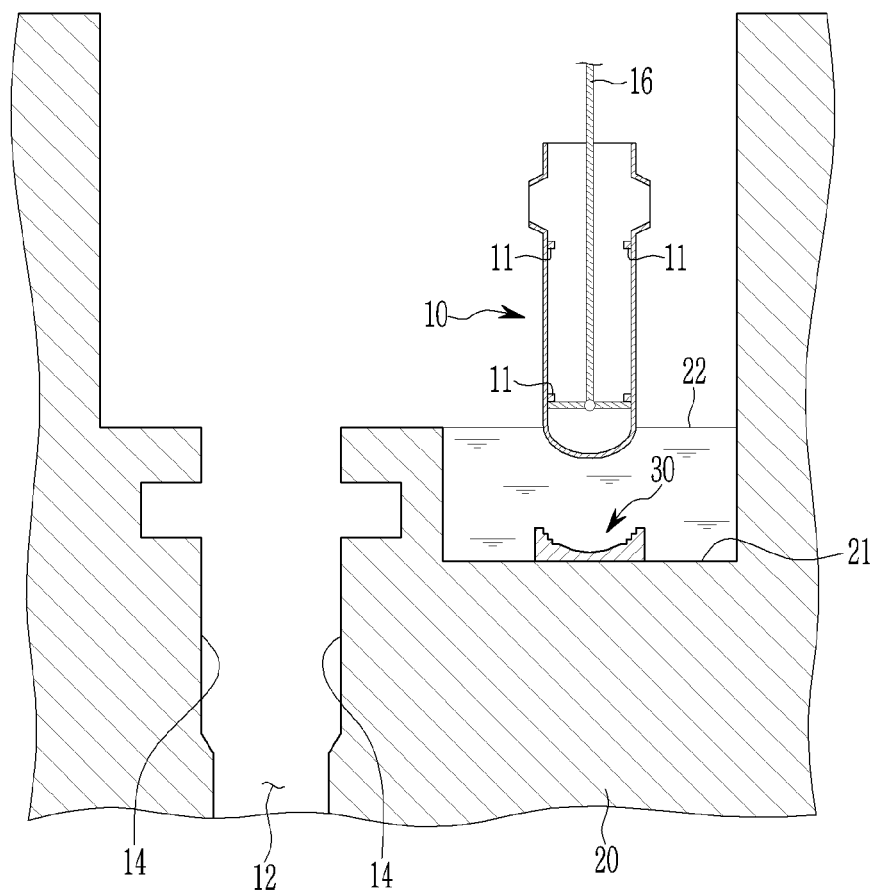
FIG. 5 illustrates a schematic view of a state in which a nuclear reactor pressure vessel is positioned on a support part of an insertion part according to an embodiment of the present invention.
Figure 6:
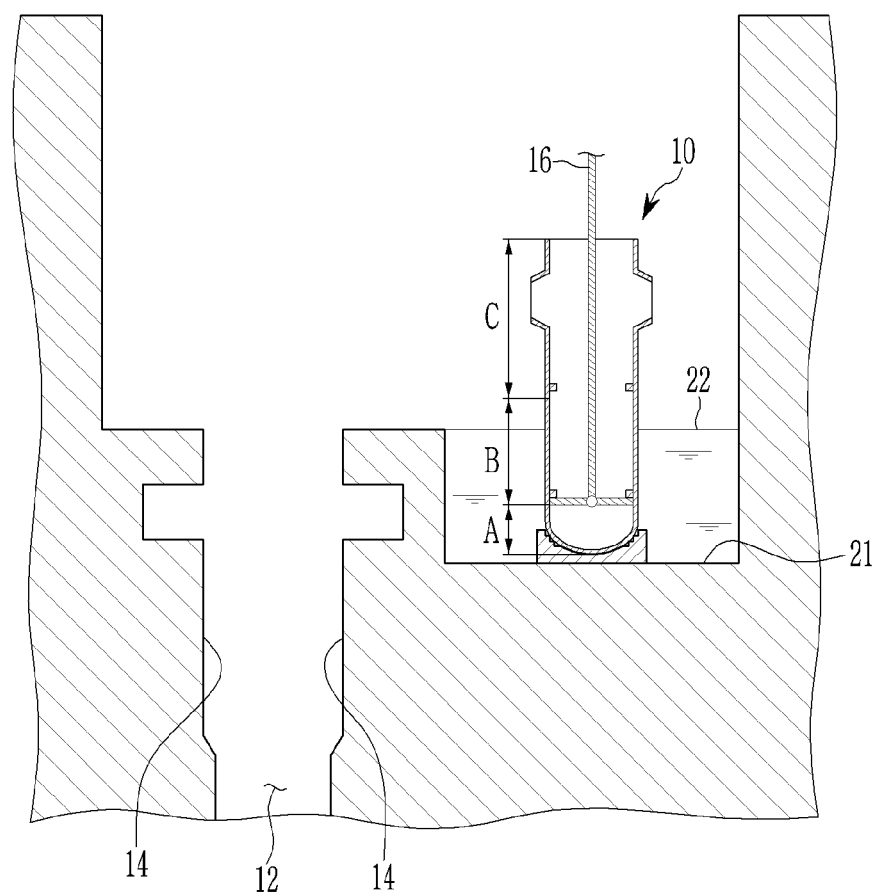
FIG. 6 illustrates a schematic view of a state in which the nuclear reactor pressure vessel of FIG. 5 is mounted on a support part.
Figure 7:
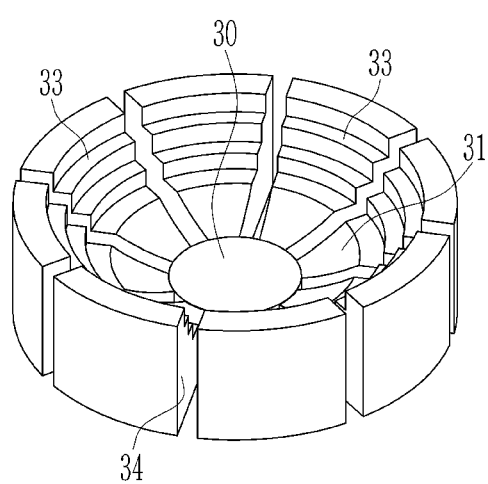
FIG. 7 schematically illustrates a perspective view of a support part according to an embodiment of the present invention.

FIG. 6 illustrates a schematic view of a state in which the nuclear reactor pressure vessel of FIG. 5 is mounted on a support part, and FIG. 7 schematically illustrates a perspective view of a support part according to an embodiment of the present invention.

Next, the nuclear reactor pressure vessel 10 is inserted in the insertion part 21 and the lower portion of the nuclear reactor pressure vessel 10 is mounted on the support part 30 as shown in FIG. 6 and FIG. 7 (S40).

In step S40, the lower portion of the nuclear reactor pressure vessel 10 may be mounted inside the insertion part 21 by using the crane 16, and the lower portion of the nuclear reactor pressure vessel 10 may be mounted on the support part 30 inside the insertion part 21.

Next, the nuclear reactor pressure vessel 10 mounted on the support part 30 is repeatedly cut in decommissioning the nuclear facility by using a cutting device at an underwater position (S50).

More specifically, step S50 may include a step of mounting a first portion that is a lower portion of the nuclear reactor pressure vessel 10 on the curved surface 31 of a mounting portion and cutting it (S51), a step of mounting a second portion that is a central portion of the nuclear reactor pressure vessel 10 on the plurality of steps 33 of the mounting portion and cutting it (S52), and a step of mounting a third portion that is an upper portion of the nuclear reactor pressure vessel on the plurality of steps 33 of the mounting portion and cutting it (S53).

In step S51, a lower portion of the first portion of the nuclear reactor pressure vessel 10 may be cut by a cutting device in a state in which the lower portion of the first portion is mounted in a surface contact with the curved surface 31 of the mounting portion formed on the support part 30 inside the insertion part 21.

In step S51, the curved surface of the mounting portion may be formed to have substantially the same curvature as a curvature of the lower portion of the nuclear reactor pressure vessel 10.

Then, in step S52, the lower portion of the second portion of the nuclear reactor pressure vessel 10 is mounted on the plurality of steps 33 to be cut by using a cutting device.

Figure 8:
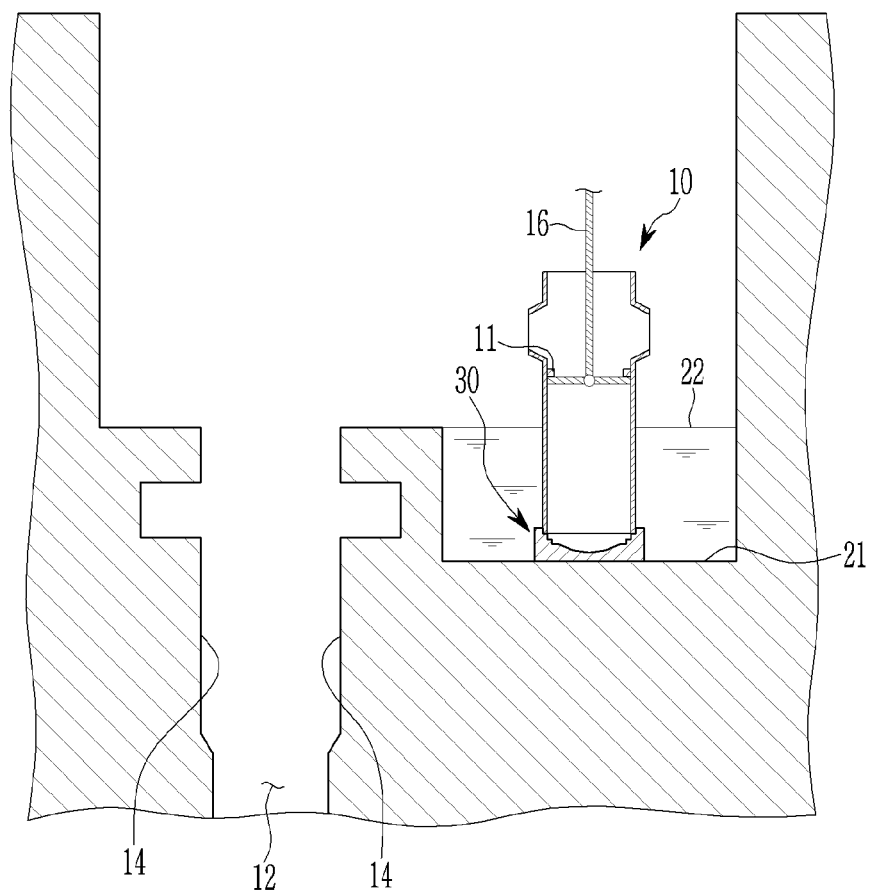
FIG. 8 illustrates a schematic view of a state in which a first part of a nuclear reactor pressure vessel according to an embodiment of the present invention is cut and mounted on a step surface of a support part.

FIG. 8 illustrates a schematic view of a state in which the first portion of a nuclear reactor pressure vessel according to an embodiment of the present invention has been cut and the lower portion of the second portion mounted on a step surface of a support part.

In step S52, as shown in FIG. 8, the lower portion of the second portion from which the first portion is removed from the nuclear reactor pressure vessel 10 is mounted, and the cut end portion of the second portion may be mounted in a surface contact state.

In this way, the nuclear reactor pressure vessel 10 is mounted in a state in which a bottom surface of the lower portion of the second portion from which the first portion thereof is removed is in surface contact with the plurality of steps 33 of the support part 30, so that more stable mounting is possible.

Figure 9:
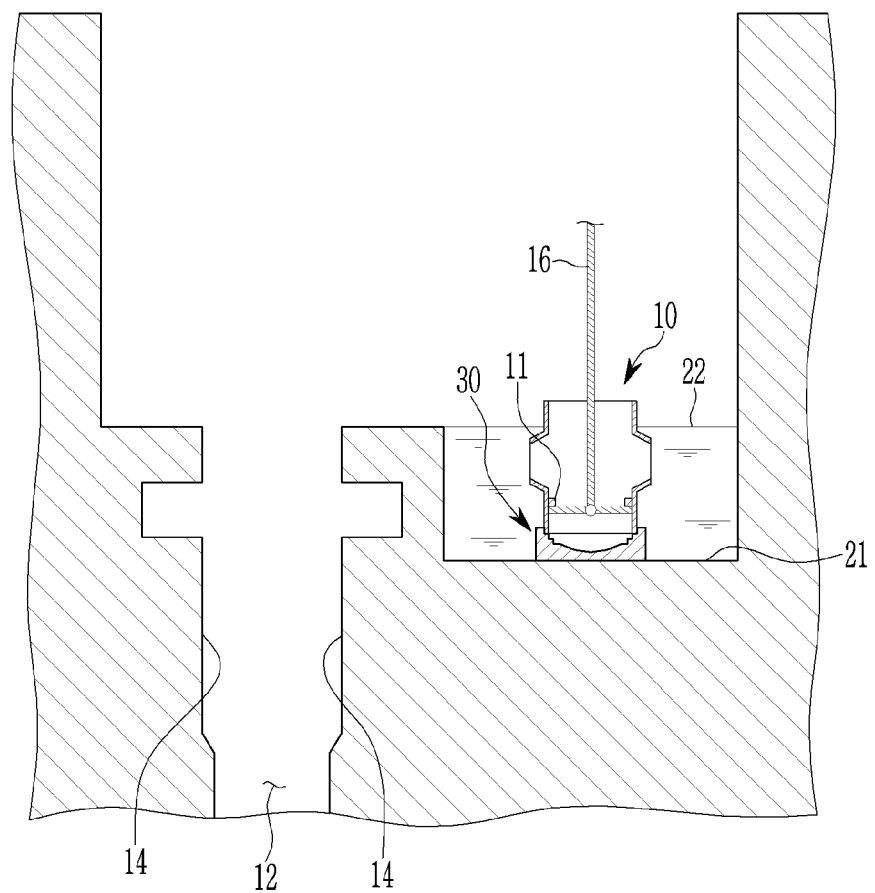
FIG. 9 illustrates a schematic view of a state in which a second part of a nuclear reactor pressure vessel according to an embodiment of the present invention is cut and mounted on a step surface of a support part.

FIG. 9 illustrates a schematic view of a state in which the second portion of a nuclear reactor pressure vessel according to an embodiment of the present invention has been cut and the lower portion of the third portion mounted on a step surface of a support part.

In addition, in step S53, as shown in FIG. 9, the lower portion of the third portion of the nuclear reactor pressure vessel 10 is mounted on the plurality of steps 33 and cut.

In step S53, the lower portion of the third portion from which the first portion and the second portion are removed from the nuclear reactor pressure vessel 10 is mounted, and the cut end portion of the third portion may be mounted in a surface contact state.

In this way, the nuclear reactor pressure vessel 10 is mounted in a state in which a bottom surface of the lower portion of the third portion from which the first and second portions thereof are removed is in surface contact with the plurality of steps 33 of the support part 30, so that more stable mounting is possible.

On the other hand, a plurality of through-holes 34 may be formed in the support part 30 to enable the cutting operation while the nuclear reactor pressure vessel 10 is mounted on the mounting portion.

The through-hole 34 penetrates from the outer surface of the support part 30 to the mounting portion, and may be formed so that the outer surface of the nuclear reactor pressure vessel 10 mounted on the support portion 30 is exposed to the outside.

A plurality of the through-holes 34 may be radially formed along the circumference of the support part 30. Therefore, the cutting device (not shown) may be inserted into the support part 30 through the through-hole 34, and thus it is possible to stably cut the lower portion of the nuclear reactor pressure vessel 10 supported by the mounting portion of the support part 30 in decommissioning the nuclear facility.

Then, the cut portions of the nuclear reactor pressure vessel 10 cut by the cutting device are transported to a process of cutting according to a packaging standard (S60) in decommissioning the nuclear facility.

In step S60, the cut portions of the nuclear reactor pressure vessel 10 are transported in water to be transported to the process of cutting according to a standard that they may be packaged in a predetermined packaging container.

As described above, according to the nuclear reactor pressure vessel 10 of the present embodiment, it is possible to perform cutting operations in the water in decommissioning the nuclear facility, and thus, in a process of cutting the nuclear reactor pressure vessel 10, it is possible to prevent radiation exposure of workers and occurrence of environmental pollution due to occurrence of dust.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS nuclear reactor pressure vessel 10, protrusion 11, pipe 13, inner wall 14, crane 16, bio-protective concrete 20, insertion part 21, support part 30, curved surface 31, plurality of steps 33, through-hole 34

The invention claimed is:

1. An underwater decommissioning method of a nuclear facility that includes a nuclear reactor pressure vessel and bio-protective concrete including a cavity in which the nuclear reactor pressure vessel is positioned, comprising:
   (a) lifting the nuclear reactor pressure vessel from the bio-protective concrete above the cavity;
   (b) forming an insertion part in the bio-protective concrete adjacent to the cavity, filling the insertion part with water, and installing a support part on a bottom surface of the insertion part;
   (c) inserting the nuclear reactor pressure vessel in the insertion part and mounting a lower portion of the nuclear reactor pressure vessel on the support part; and
   (d) repeatedly cutting portions of the nuclear reactor pressure vessel mounted on the support part by using a cutting device in an underwater position in decommissioning the nuclear facility,
   wherein the (d) step includes:
   (1) cutting portions of the nuclear reactor pressure vessel at a position below a water surface of the insertion part in decommissioning the nuclear facility; and
   (2) transporting portions of the nuclear reactor pressure vessel cut in the step to a packaging container,
   wherein the support part includes a mounting portion corresponding to the lower portion of the nuclear reactor pressure vessel,
   wherein the mounting portion includes a curved surface and a plurality of steps, and
   wherein the support part is provided with a through hole that penetrates from an outer surface thereof to a position of the mounting portion so that an outer surface of the nuclear reactor pressure vessel mounted on the support part is exposed and through which the cutting device is inserted.

2. The underwater decommissioning method of the nuclear facility of claim 1, wherein
   a plurality of the through holes are radially formed with respect to a center of the mounting portion.

3. The underwater decommissioning method of the nuclear facility of claim 1, wherein the portions of the nuclear reactor pressure vessel includes a first portion that is a lower portion of the nuclear reactor pressure vessel, a second portion that is a central portion thereof, and a third portion that is an upper portion thereof, and
   the (1) step includes:
   mounting a lower portion of the first portion of the nuclear reactor pressure vessel on the curved surface of the mounting portion and cutting it;
   mounting a lower portion of the second portion of the nuclear reactor pressure vessel on the plurality of steps of the mounting portion and cutting it; and
   mounting a lower portion of the third portion of the nuclear reactor pressure vessel on the plurality of steps of the mounting portion and cutting it.

4. The underwater decommissioning method of the nuclear facility of claim 1, wherein
   the nuclear facility further includes a crane positioned above the bio-protective concrete, and
   the lifting of the nuclear reactor pressure vessel above the cavity is performed by lifting the nuclear reactor pressure vessel from the bio-protective concrete by using the crane.

* * * * *